US009244614B2

(12) United States Patent
Konovalov et al.

(10) Patent No.: US 9,244,614 B2
(45) Date of Patent: Jan. 26, 2016

(54) MEMORY COALESCING COMPUTER-IMPLEMENTED METHOD, SYSTEM, APPARATUS AND COMPUTER-READABLE MEDIA

(75) Inventors: Alexandr Konovalov, Nizhny Novgorod (RU); Alexey Kukanov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 280 days.

(21) Appl. No.: 13/996,504

(22) PCT Filed: Apr. 4, 2011

(86) PCT No.: PCT/RU2011/000553
§ 371 (c)(1),
(2), (4) Date: Sep. 10, 2013

(87) PCT Pub. No.: WO2013/022362
PCT Pub. Date: Feb. 14, 2013

(65) Prior Publication Data
US 2015/0347023 A1    Dec. 3, 2015

(51) Int. Cl.
*G06F 12/02* (2006.01)
*G06F 3/06* (2006.01)

(52) U.S. Cl.
CPC ............ *G06F 3/0608* (2013.01); *G06F 3/0644* (2013.01); *G06F 3/0673* (2013.01)

(58) Field of Classification Search
CPC .... G06F 3/0606; G06F 3/0644; G06F 3/0673
See application file for complete search history.

(56) References Cited

U.S. PATENT DOCUMENTS

| 4,604,694 | A | 8/1986 | Hough | |
|---|---|---|---|---|
| 6,175,900 | B1 | 1/2001 | Forin et al. | |
| 6,427,195 | B1 * | 7/2002 | McGowen | G06F 9/5016 711/153 |
| 6,640,290 | B1 | 10/2003 | Forin et al. | |
| 6,701,420 | B1 * | 3/2004 | Hamilton | G06F 12/023 707/999.202 |
| 2005/0066143 | A1 * | 3/2005 | Schopp | G06F 12/023 711/170 |
| 2006/0190697 | A1 * | 8/2006 | Grant | G06F 12/023 711/170 |

(Continued)

FOREIGN PATENT DOCUMENTS

CN    1924829 A    3/2007

OTHER PUBLICATIONS

International Search Report and Written Opinion mailed Apr. 19, 2012 for International Application No. PCT/RU2011/000553, 6 pages.

(Continued)

*Primary Examiner* — Hiep Nguyen
(74) *Attorney, Agent, or Firm* — Schwabe, Williamson & Wyatt, P.C.

(57) ABSTRACT

Embodiments of computer-implemented methods, apparatus and computer-readable media associated with memory management are disclosed herein. A computer-implemented method to coalesce free intervals of a memory may include ascertaining that a first interval of the memory is free (302, 304). A determination may be made, e.g., from a header associated with the first interval of the memory, whether a second interval of the memory, immediately preceding or following the first interval of the memory, is free (306). After a determination is made that the second interval of the memory is free, the first interval of the memory and the second interval of the memory may be coalesced (310). Other embodiments may be described and/or claimed.

27 Claims, 4 Drawing Sheets

(56) References Cited

U.S. PATENT DOCUMENTS

| | | | |
|---|---|---|---|
| 2007/0011415 A1* | 1/2007 | Kaakani | G06F 12/0269 711/159 |
| 2007/0011660 A1* | 1/2007 | Garyali | G06F 12/0269 717/127 |
| 2007/0271408 A1 | 11/2007 | Eguchi et al. | |
| 2009/0254596 A1* | 10/2009 | Dussud | G06F 12/0276 707/813 |
| 2009/0276602 A1* | 11/2009 | Chedru | G06F 12/023 711/171 |
| 2010/0331082 A1 | 12/2010 | Ju et al. | |
| 2012/0054746 A1* | 3/2012 | Vaghani | G06F 9/5022 718/1 |

OTHER PUBLICATIONS

P. R. Wilson et. al., "Dynamic Storage Allocation: A Survey and Critical Review", Lecture Notes in Computer Science, 986, 1995, 78 pages.

C. S. Ellis et al., "Algorithms for Parallel Memory Allocation", International Journal of Parallel Programming, vol. 17 (4), 1988, 43 pages.

T. Johnson et al., "Space Efficient Parallel Buddy Memory Management", Fourth International Conference on Computing and Information, 1992. Proceedings. ICCI '92, 5 pages.

R. Jones et al., "Garbage Collection: Algorithms for Automatic Dynamic Memory Management", John Wiley & Sons, Inc., New York, NY, 1996, Sections 6.1, 8.1, 12 pages.

D.E. Knuth, "Art of Computer Programming, vol. 1: Fundamental Algorithms (3rd Ed.), Addison-Wesley Professional; 1997, Section 2.5 "Dynamic Storage Allocation"", A. Reservation—B. Liberation, 14 pages.

A. Kukanov et al., "The Foundations for Scalable Multi-core Software in Intel® Threading Building Blocks", Intel Technology Journal. vol. 11, Issue 04, Nov. 2007, 14 pages.

Intel® Threading Building Blocks Reference Manual, Chapter 8 "Memory Allocation", 10 pages.

J. Reinders, "Scalable Memory Allocation", Intel Threading Building Blocks: Outfitting C++ for Multi-core Processor Parallelism. O'Reilly Media, Inc., 2007, Chapter 6, pp. 101-109.

Google TCMalloc, http://google-perftools.googlecode.com/svn/trunk/doc/tcmalloc.html, 8 pages.

Emery D. Berger et al., "Hoard: A Scalable Memory Allocator for Multithreaded Applications", Proceedings of the ninth international conference on Architectural support for programming languages and operating systems, Nov. 2000, p. 117-128.

D. Lea, "A Memory Allocator", http://g.oswego.edu/dl/html/malloc.html, 7 pages.

W. Gloger, "Dynamic memory allocator implementations in Linux system libraries", http://www.malloc.de/papers/malloc-slides.html, 7 pages.

Extended European Search Report mailed Feb. 24, 2015 for European Patent Application No. 11870564.9, 8 pages.

\* cited by examiner

MEMORY COALESCING COMPUTER-IMPLEMENTED METHOD, SYSTEM, APPARATUS AND COMPUTER-READABLE MEDIA

CROSS REFERENCE TO RELATED APPLICATIONS

The present application is a national phase entry under 35 U.S.C. §371 of International Application No. PCT/RU2011/000553, filed Aug. 4, 2011, entitled "MEMORY COALESCING COMPUTER-IMPLEMENTED METHOD, SYSTEM, APPARATUS AND COMPUTER-READABLE MEDIA", which designated, among the various States, the United States of America. The Specification of the PCT/RU2011/000553 Application is hereby incorporated by reference.

FIELD

Embodiments of the present invention relate generally to the field of computing, and more particularly, to defragmentation of memory of a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Computer programs, or applications, often include logic for dynamic management of memory allocated to the computer programs or applications by the Operating System ("OS"), also referred to as "run-time memory management." Often, computer programs or applications acquire large blocks of memory from the system memory pool managed by the OS, then split those blocks into smaller parts, and allocate/de-allocate them for internal use. Memory no longer needed may be retained nonetheless for possible reuse by the application. Though some memory may be returned to the system memory pool and the OS during program execution, the memory allocated to an application is returned in full typically only on exit of the application.

Various techniques may be used to improve dynamic memory management by an application. For example, to reduce memory consumption, memory splitting/coalescing, rounding of user-required sizes and fragmentation avoidance may be implemented. For faster performance, low algorithmic complexity and locality of references may be important. For faster performance and scalability in multi-threaded applications, dynamic memory management by an application may include minimizing data sharing and maximizing concurrency for simultaneous operations. In general, high performance in multi-threaded memory allocation may be achieved by using separate per thread or per central processing unit ("CPU") memory heaps that mostly operate independently. However, these independent memory heaps may take memory from the same address space, which may be shared among all threads in the application and may also become fragmented, leading to increased memory consumption.

Various approaches for avoiding memory fragmentation may noticeably decrease performance of applications with multiple threads actively allocating and de-allocating dynamic memory. For example, some of these approaches may require that no other memory management operation may be executed at the same time.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In various embodiments, a non-transitory computer-readable medium may be provided, having computer-readable and executable code embodied therein. The code may include instructions configured to enable an application operated by an apparatus, in response to execution of the instructions to ascertain whether a first interval of a memory is free. Additionally, the instructions may enable an application to modify a state of the first interval of the memory to indicate that the first interval of the memory is in a coalescing state. The instructions may determine whether a second interval of the memory, immediately preceding or immediately following the first interval of the memory, is free. After a determination that the second interval of the memory is free, the instructions may enable the application to modify a state of the second interval of the memory to indicate that the second interval of the memory is in a coalescing state. The instructions may then enable the application to coalesce the first interval of the memory and the second interval of the memory.

In some embodiments, the non-transitory computer-readable medium may further include instructions configured to enable the application, in response to execution of the instructions, to determine, from a header associated with the first interval of the memory, whether the second interval of the memory is free, in use, or in a coalescing state. In some embodiments, the application may be enabled to determine, from the header associated with the first interval of the memory, a size of the second interval of the memory. In some embodiments, the application may be enabled to lock the first interval of the memory and the second interval of the memory to prevent modification by application threads other than an application thread that invoked the memory manager. In some embodiments, the application may be enabled to determine whether the second interval of the memory is free, determine the size of the second interval of the memory, modify the state of the second interval of the memory to indicate that it is in coalescing, and lock the second interval of the memory in an atomic operation. In some embodiments, the atomic operation may be a compare-and-swap operation.

In some embodiments, the application may be enabled to, after a determination that the second interval of the memory is in a coalescing state, insert an identification of the first interval of the memory into a coalesce queue to temporarily delay coalesce of the first and second intervals of the memory. In some embodiments, the application may further be enabled to remove the first interval of the memory from the coalesce queue on a determination that the second interval of the memory has transitioned from an in coalescing state to free, to enable the coalesce operation to coalesce the first and second intervals of the memory to proceed. In some embodiments, the application may be enabled to modify a state of the first interval of the memory to indicate that the first interval of the memory is free after a determination that the second interval of the memory is in use.

In various embodiments, a non-transitory computer-readable medium having computer-readable and executable code embodied therein may be provided. The code may include instructions configured to enable an application operated by an apparatus, in response to execution of the instructions to ascertain that a first interval of a memory is free. The application may also be enabled to determine, from a header associated with the first interval of the memory, whether a second interval of the memory, immediately preceding the first interval of the memory, is free or is currently being coalesced with a third interval of the memory, after ascertaining that the first interval of the memory is free. The application may further be enabled to coalesce the first interval of the memory and the second interval of the memory where the second interval of the memory is free. The application may further be enabled to insert an identification of the first interval of the memory into a coalesce queue where the second interval of the memory is currently being coalesced with the third interval of the memory to temporarily delay coalesce of the first and second intervals of the memory.

In various embodiments, a non-transitory computer-readable medium having computer-readable and executable code embodied therein may be provided. The code may include instructions configured to enable an application operated by an apparatus, in response to execution of the instructions to ascertain that a first interval of a memory is free. The application may also be enabled to determine whether a second interval of the memory, immediately preceding or following the first interval of the memory, is free or is currently being coalesced with a third interval of the memory. The application may also be enabled to coalesce the first interval of the memory and the second interval of the memory, if the second interval of the memory is determined to be free, or insert an identification of the first interval of the memory into a coalesce queue, if the second interval of the memory is determined to be currently being coalesced with the third interval of the memory, to temporarily delay coalesce of the first and second intervals of the memory.

In various embodiments, a method having a number of the above described operations may be practiced. In various embodiments, an apparatus may be configured to practice such a method. In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
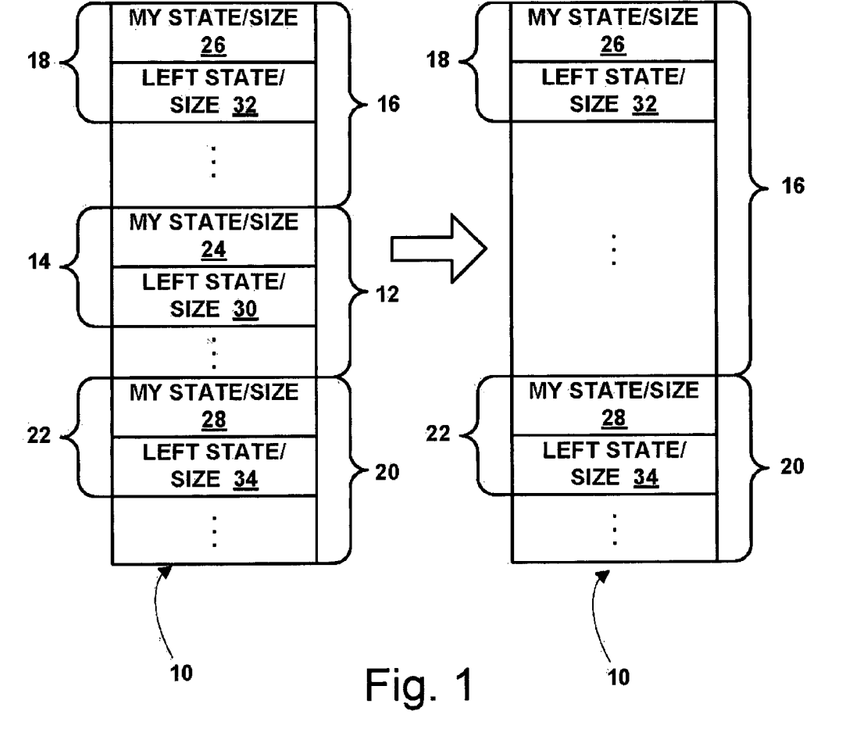
FIG. 1 schematically illustrates an example of memory intervals being coalesced, according to embodiments of the disclosure.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, a computer program, and/or other suitable components that provide the described functionality. Referring now to FIG. 1, wherein an example of memory intervals being coalesced, according to embodiments of the disclosure, is shown. As illustrated, a memory 10 may include a first interval of memory 12 having an associated header 14. Immediately preceding first interval of memory 12 may be a second interval of memory 16, also having an associated header 18. Immediately following first interval of memory 12 may be a third interval of memory 20, likewise having an associated header 22.

A header may include various information about an associated interval of memory, such as its state and/or size. For example, header 14 associated with first memory interval 12 may include information 24 about the state and/or size of first interval of memory 12. As will be discussed below, in some embodiments the state may also be indicative of whether an interval of memory is locked. In other embodiments, a separate locking field (not shown) may be used to indicate whether the interval of memory is locked. Like header 14 associated with first interval of memory 12, header 18 associated with second interval of memory 16 may include information 26 about the interval's state and/or size, and header 22 associated with third interval of memory 20 may include information 28 about the interval's state and/or size. In various embodiments, the states of an interval of memory may include a free state, an in-use/locked state, and/or a coalescing/locked state.

An interval of memory may be coalesced with an immediately following interval of memory, otherwise known as a "right neighbor," in various manners. For example, in FIG. 1, the size of first interval of memory 12 may be added to its location (e.g., using pointer arithmetic) to determine the location of third interval of memory 20. Header 22 of third interval of memory 20 may then be examined to determine its state (e.g., free, coalescing or in use) and size. If third interval of memory 20 is free, the two intervals may be coalesced (combined) into a single interval of memory and a single associated header.

An interval of memory may also be coalesced with an immediately preceding interval of memory, otherwise known as its "left neighbor." However, this may be slightly more complex as the location of the left neighbor may not be readily apparent or computable without its size. Furthermore, coalescing with a left neighbor may complicate coalescing with a right neighbor, because of a possibility of conflicting coalescing requests for the same interval of memory.

Accordingly, in addition to information about itself, in some embodiments, each interval of memory may include, in an associated header, information about an immediately preceding interval of memory. For example, in FIG. 1, first interval of memory 12 may include, in its associated header 14, information 30 about second interval of memory 16, such as the size and/or the state of second interval of memory 16. With the size of second interval of memory 16 known, the starting location of second interval of memory may be calculated by, e.g., subtracting the size from a starting address of first interval of memory 12. Similarly, second interval of memory 16 may include, in associated header 18, information 32 about the size and/or state of its left neighbor (not shown), and third interval of memory 20 may include, in associated header 22, information 34 about the size and/or state of the first interval of memory 12.

To avoid conflicting modifications of information associated with intervals of the memory, particularly for a multi-threaded application, exclusive access, also known as "locking," may be used by individual threads of the application. In various embodiments, an interval of memory may be locked in a way that does not prevent or block execution of operation with other intervals of memory. For example, a first interval of memory and a second interval of memory may be locked independently, without preventing or blocking operations with other intervals of memory being performed by other threads of a multi-threaded application.

If an interval of memory is being used by an application or is coalescing with another interval of memory, it may be locked. In some embodiments, both a first interval of memory and a second interval of memory that are to be coalesced may be locked to prevent modification by application threads other than an invoking application thread. As will be discussed below, in some embodiments, information about memory intervals (e.g., 24-34) may also indicate whether the interval of memory is locked, whereas in other embodiments, a separate locking field (not shown) may be used. In some embodiments, locking an interval of memory may require modifying information associated with both the interval of memory and a neighboring interval of memory. For example, locking memory interval 12 may require modifying both information 24 (or a separate locking field) in its associated header 14 and information 34 (or a separate locking field) in the header 22 of its right neighbor. If, after a modification is made to a header of one interval of memory, it is determined that information in a header of its neighbor indicates a conflicting concurrent modification, locking of the memory interval may be cancelled. If a modification was made in the first header, it may be reverted.

In various embodiments, when neighboring intervals of memory are determined to be free, they may be coalesced into a single interval of memory. For example, in FIG. 1, first interval of memory 12 may be determined to be free, either from examining information 24 in its header 14, or implicitly, such as when the interval of memory is released by an application. In some embodiments, the first interval of memory 12 may then be locked, e.g., by updating its state information 24 and/or by updating a separate lock field (not shown), for potential coalescing with a neighboring interval of memory.

Once an interval of memory is determined to be free, its neighbors may be checked to determine whether coalescing is possible. For example, once first interval of memory 12 is determined to be free, information 30 about second interval of memory 16 may be examined to determine whether second interval of memory 16 is free, as well as its size. In some embodiments, the second interval of memory 16 may be locked at this time, either by updating its state information 26 or a separate lock field (not shown). Assuming second interval of memory 16 is free, the first and second intervals of memory may be coalesced into a single interval of memory, as shown on the right side of FIG. 1. After first interval of memory 12 and second interval of memory are coalesced, information 26 about second interval of memory 16 may be updated to reflect the new larger size of second interval of memory 16. Additionally, in some embodiments, information 34 in header 22 of third interval of memory 20 may be updated to reflect its new left neighbor.

An interval of memory 12 alternatively may be coalesced with its right neighbor in a similar manner. For example, assume that second interval of memory 16 is released by an application, rather than first interval of memory 12. It then may be determined whether first interval of memory 12 is free. In some embodiments this may be done by examining information 24 in header 14 of first interval of memory 12 (which as described above may be located using pointer arithmetic). If first interval of memory 20 is free, then second interval of memory 16 and first interval of memory 12 may be coalesced.

In some embodiments, information (e.g., 24-34) contained in headers about states and/or sizes of intervals of memory may be stored in multi-purpose or combined size-and-state fields. This may allow for both the state and size of an interval of memory to be determined in a single memory read operation. For example, a read operation may be performed using, as input, any of 24-34, and may yield both the size and state of an interval of memory. In some embodiments, if a multi-purpose field contains a value below a first threshold, the memory interval may be determined to be in a first state. Values between the first threshold and a second threshold may indicate that the memory interval is in a second state, and values above the second threshold may indicate that the memory interval is in a third state. The size of the memory interval may be determined using arithmetic and/or bitwise operations on the values in the multi-purpose fields. Additionally, if one or both thresholds correspond to a minimum and/or maximum allowed memory interval size, no additional computation may be necessary to determine the size of the memory interval. Alternatively, intervals of memory may be configured to be sizes that are multiples of a predetermined power of two. In such cases, lower bits of a multi-purpose field may be unused by any valid size value, and may be used to store a state value.

In some embodiments, the multi-purpose size-and-state field may also be used for locking of intervals of memory. This may facilitate reading the state and size of an interval of memory and locking the interval in a single atomic operation. For example, in some embodiments a compare-and-swap operation may be performed using, as input, any of 24-34, and may modify the field to indicate that the interval of memory is locked while also yielding the interval's size and state prior to the operation. In some embodiments, an interval of memory may be considered locked when in some states and unlocked when in other states. For example, in some embodiments, if an interval of memory is in a free state, it may be determined to be unlocked, while for all other states (e.g., in use or coalescing) the interval of memory may be determined to be locked.

Figure 2:
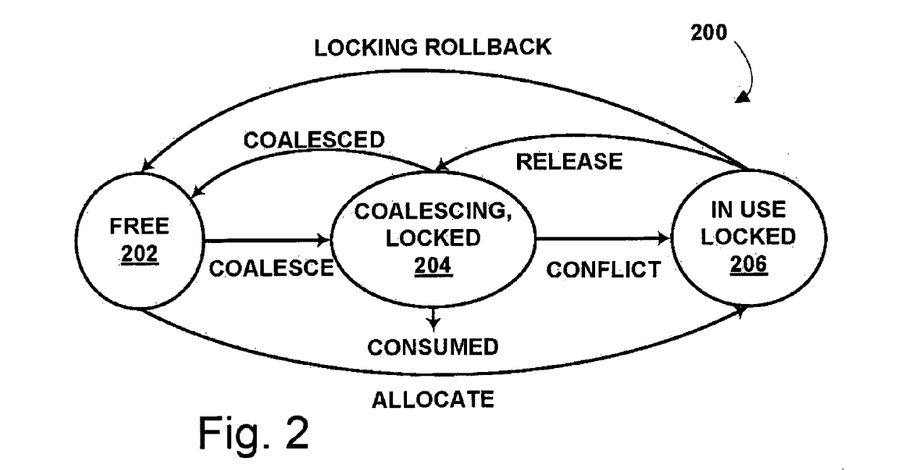
FIG. 2 schematically depicts example states and transitions of memory intervals, according to embodiments of the disclosure.

FIG. 2 depicts the states and state transitions 200 of intervals of memory, in accordance with various embodiments. An interval of memory may be in a FREE state 202 if it is not currently being used by its owner application or being coalesced with another interval of memory. From state 202, if the interval of memory is allocated for use by the application, then its state may transition to an IN USE/LOCKED state 206. If an interval of memory is selected to be coalesced, then it may transition from the FREE state 202 to a COALESCING/LOCKED state 204 to ensure that the interval of memory is not allocated or otherwise modified during coalescing.

While transitioning an interval of memory from the FREE state 202 to the IN USE/LOCKED state 206, it may be determined that the interval of memory is being concurrently transitioned to IN USE/LOCKED state 206 or to the COALESCING/LOCKED state 204 by another thread or CPU. In such case, the associated header information, that may have already been modified to reflect the transition, may be reverted to the FREE state 202 (also referred to as "locking rollback"), to avoid the conflict with the concurrently performed transition.

From the COALESCING/LOCKED state 204, if the interval of memory is coalesced with its left neighbor, the interval may be said to have been "consumed," after which it may no longer exist as an independent interval of memory with its own header. An example of this is seen in FIG. 1, wherein first interval of memory 12 is consumed by second interval of memory 16, so that first interval of memory 12 no longer exists as an independent interval of memory with a header. If, instead of being consumed by its left neighbor, the interval of memory consumes its right neighbor, then after coalescing the interval of memory may transition back to the FREE state 202. For example, in FIG. 1, after first interval of memory 12 is consumed by second interval of memory 16, second interval of memory may transition from the COALESCING/LOCKED state 204 to the FREE state 202.

From state 204, it also may be determined that an interval of memory's left or right neighbor is in the IN USE/LOCKED state 206. In such case, the interval of memory may be returned to the FREE state 202. However, from state 204, if it is determined that the neighbor interval is also in the COALESCING/LOCKED state 204, or the neighbor interval is being transitioned to state 204 or to state 206 by another memory management thread, then the interval of memory may transition to the IN USE/LOCKED state 206 and an identification of the interval of memory be inserted into a coalesce queue (not shown) until its neighbor is free to coalesce. For example, even if an interval of memory's own information about its left neighbor indicates that the left neighbor is in the FREE state 202, the left neighbor may be in the process of being acquired by another memory management thread. This may be determined from the left neighbor's own header being in the COALESCING/LOCKED state 204. While in the IN USE/LOCKED state 206, the interval of memory may be utilized by the owner application and inaccessible for other usage, or it may be in the coalesce queue. From the IN USE/LOCKED state 206, an interval of memory may transition to the COALESCING/LOCKED state 204 (e.g., "released" for coalescing) when it is de-allocated by the owner application or when it is released from the coalesce queue because its neighbor is no longer in the COALESCING/LOCKED state 204.

Figure 3:
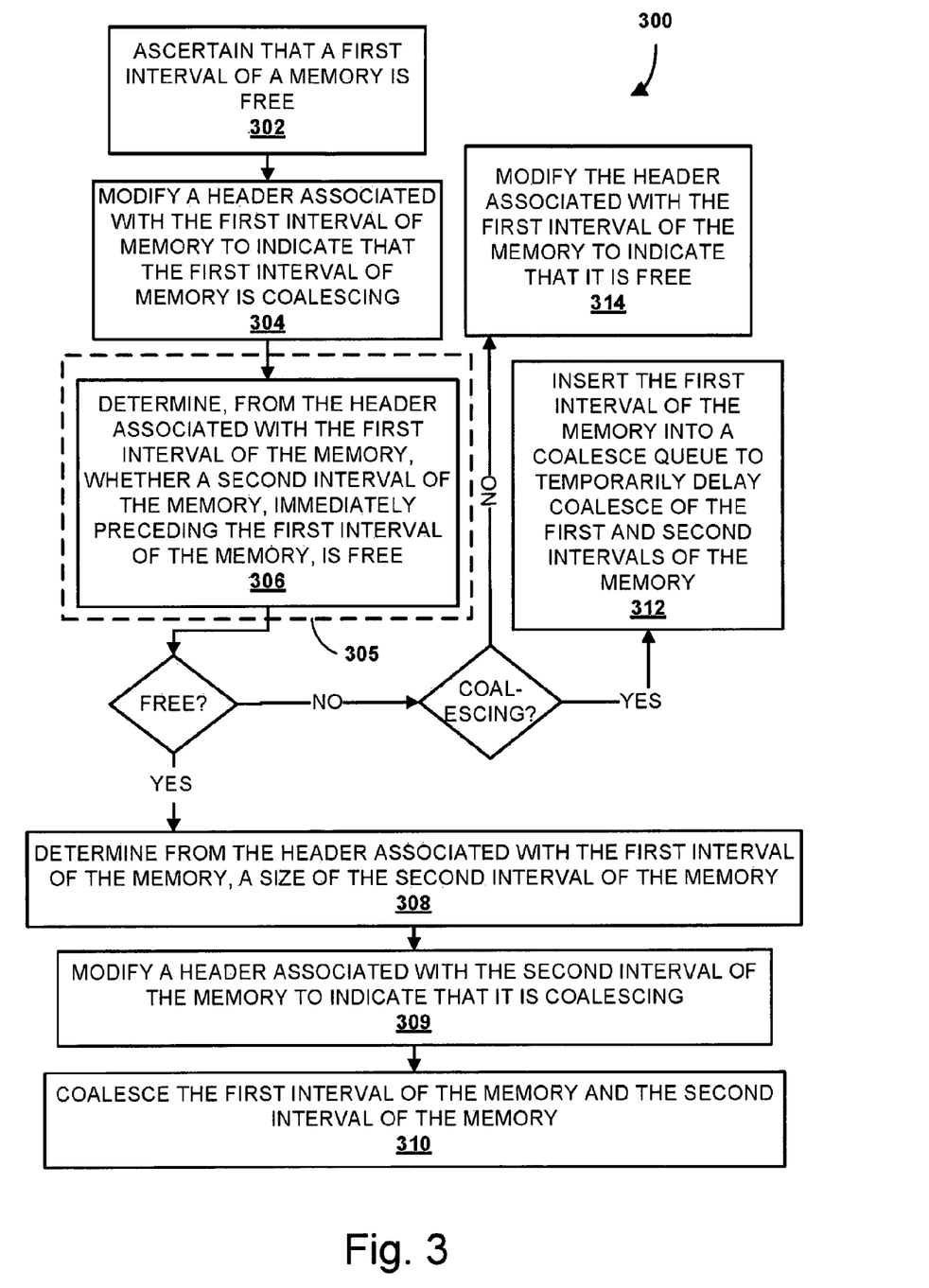
FIGS. 3 and 4 schematically depict example methods, according to embodiments of the disclosure.

An example method 300 of coalescing intervals of memory, in accordance with various embodiments, is depicted in FIG. 3. At block 302, an application may ascertain that a first interval of memory is free. For example, an application may de-allocate a first interval of memory, in which case it may be ascertained that the first interval of memory is free. In some embodiments, intervals of memory may be periodically examined by the dynamic memory management logic of an application to determine whether they are free.

At block 304, a header associated with the first interval of memory may be modified to indicate that the first interval of memory is coalescing. For example, header 14 of first interval of memory 12, and more particularly, information 24 about its state, may be modified to indicate that the first interval of memory 12 is in the COALESCING/LOCKED state 204. In some embodiments, a header of a right neighbor also may be modified to indicate that the first interval of memory is in the COALESCING/LOCKED state 204.

At block 305, it may be determined whether a second, neighboring interval of memory is free. For example, at block 306, it may be determined, from the header associated with the first interval of the memory, whether the second interval of the memory immediately preceding the first interval of the memory (left neighbor) is free. For example, information 30 in header 14 associated with first interval of memory 12 may be examined to determine if second interval of memory 16 is at the FREE state 202. Although not shown, it may alternatively be determined whether another interval of memory immediately following the first interval of memory (right neighbor) is free. If, at block 305, it is determined that the second interval of memory is free, then, in some embodiments, a size of the second interval of memory may be determined from the header associated with the first interval of memory, at block 308. In some embodiments, blocks 305-308 may be performed in a single memory read operation. At block 309, information associated with the second interval of memory may be modified to indicate that the second interval of memory is in coalescing. For example, information 30 about the state of the left neighbor interval 16 in the header 14 of the first interval of memory 12, as well as information 26 in the header 18, may be modified to indicate that the interval 16 is in the COALESCING/LOCKED state 204. In some embodiments, an atomic operation (e.g., compare and swap) may be used to perform blocks 305-309, e.g., by reading and updating its combined size-and-state field.

At block 310, the first interval of the memory and second interval of the memory may be coalesced into a single, larger interval of memory. For example, first interval of memory 12 in FIG. 1 was coalesced with (and consumed by) second interval of memory 16.

However, it may be determined at block 305 that the second interval of memory is not free. In that case, if the second interval of memory is coalescing (e.g., at state 204) with another interval of memory, then an identification of the first interval of memory may be inserted into a coalesce queue at block 312. This may temporarily delay coalescing of the first and second intervals of memory until the second interval of memory is available.

While in the coalesce queue, the first interval of memory may be set to the IN USE/LOCKED state 206. In some embodiments, the coalesce queue may be a linked list, though other data structures may be used. In some embodiments, the queue may be a first-in-first-out ("FIFO") queue, though other ordering techniques may be used. In some embodiments, the queue may be non-blocking. For example, use of the queue in this manner may ensure that concurrently running operations may progress towards insertion or removal of an identification of an interval of memory to/from the queue even if one or more of these operations are temporarily stopped.

If the second interval of memory is not coalescing (e.g., state 204) but is instead in use (e.g., state 206), then at block 314 the header associated with the first interval of memory may be modified to indicate that it is free (e.g., state 202).

Method 300 as described above is not meant to be limiting. The various actions may be performed in various orders not shown. Moreover, one or more actions may be omitted and/or added. For example, an interval of memory may be coalesced with its right neighbor before or after it is coalesced with its left neighbor.

Figure 4:
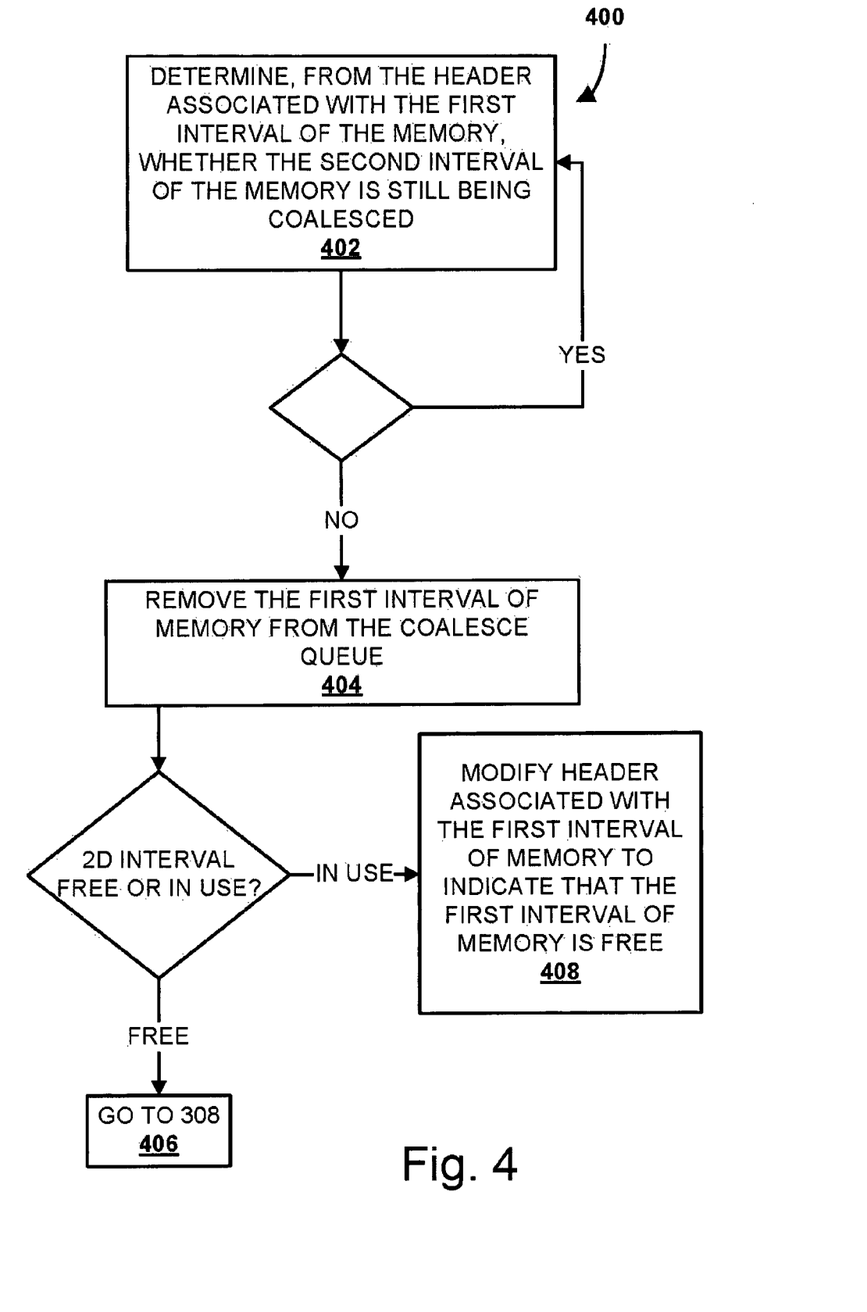

FIG. 4 depicts an example method 400 for processing a coalesce queue, in accordance with various embodiments. As illustrated, at block 402, it may be determined, e.g., by an application from the header associated with the first interval of the memory, whether the second interval of the memory is still being coalesced with the third interval of the memory. For example, upon passage of a predetermined amount of time after its identification has been inserted into the coalescing queue, the header of the first interval of the memory may be reexamined to determine whether the second interval of memory is still coalescing. If so, then the method may proceed back to block 402 upon passage of another predetermined time interval.

If not, then the first interval of the memory may be removed from the coalesce queue at block 404. If the second interval of memory transitioned to being free, then at block 406, the method may proceed back to block 308 of FIG. 3, so that the first and second intervals of memory may be coalesced. If, however, the second interval of memory transitioned to being in use (e.g., it was allocated to another thread of a multi-threaded application), then the first interval of memory may simply be returned to the free state at block 408, as the second interval of memory may not be available for some time.

In some embodiments, whenever a new interval of memory is needed, the dynamic memory management logic may first attempt to obtain memory from the coalescing queue by rechecking intervals of memory contained therein and coalescing if possible. In some embodiments, the dynamic memory management logic only seeks out other free memory if all intervals of memory in the coalescing queue are determined to still be coalescing.

The techniques and apparatuses described herein may be implemented into a system or apparatus using suitable hardware and/or software to configure as desired. Further, while embodiments of the disclosure has been described thus far as dynamic memory management of an application, embodiments of the present disclosures, or aspects thereof, may be practice by an operating system, a virtual machine manager, or other memory management entities.

Figure 5:
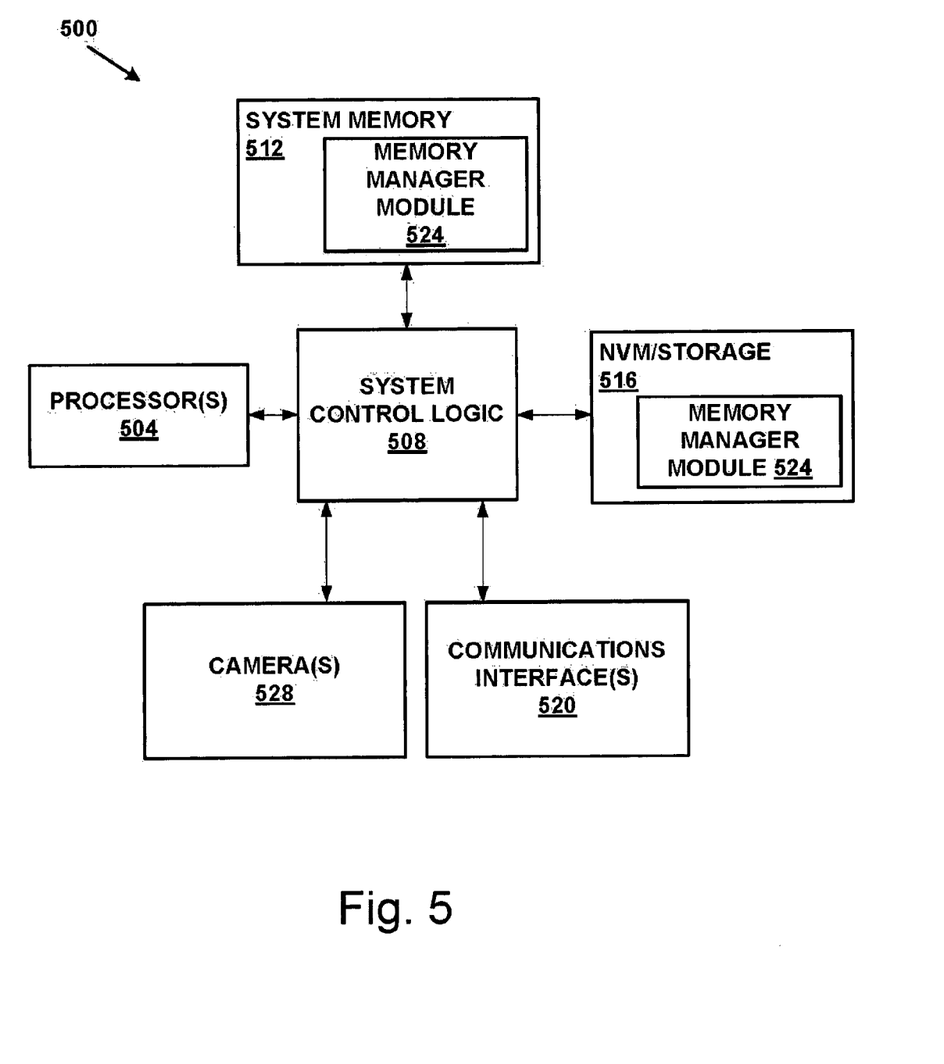
FIG. 5 schematically depicts an example system configured to implement dynamic memory management, in accordance with embodiments of the disclosure.

FIG. 5 illustrates, for various embodiments, an example system 500 comprising one or more processor(s) or processor cores 504, system control logic 508 coupled to at least one of the processor(s) or processor cores 504, system memory 512 coupled to system control logic 508, non-volatile memory (NVM)/storage 516 coupled to system control logic 508, and one or more communications interface(s) 520 coupled to system control logic 508.

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

System control logic 508 for one embodiment may include one or more input/output (I/O) controller(s) to provide an interface to NVM/storage 516 and communications interface(s) 520.

NVM/storage 516 may be used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s) for example.

The NVM/storage 516 may include a storage resource physically part of a device on which the system 500 is installed or it may be accessible by, but not necessarily a part of, the device. For example, the NVM/storage 516 may be accessed over a network via the communications interface(s) 520.

Communications interface(s) 520 may provide an interface for system 500 to communicate over a communication channel 526 with one or more, network(s) 528 and/or with any other suitable device. Communications interface(s) 520 may include any suitable hardware and/or firmware. Communications interface(s) 520 for one embodiment may include, for example, a wireless network adapter. The communications interface(s) 520 may use one or more antenna(s).

System memory 512 and NVM/storage 516 may include temporal and persistent copies of a virtual machine manager, an operating system or an application having a memory manager module 524, respectively. The memory manager module 524 may include instructions that when executed by at least one of the processor(s) or processor core(s) 504 results in the operating system or application performing the earlier described memory management methods/operations. In some embodiments, the memory manager module 524 may additionally/alternatively be located in the system control logic 508.

For some embodiments, at least one of the processor(s) or processor core(s) 504 may be packaged together with logic for one or more controller(s) of system control logic 508. For some embodiments, at least one of the processor(s) or processor core(s) 504 may be packaged together with logic for one or more controllers of system control logic 508 to form a System in Package (SiP). For some embodiments, at least one of the processor(s) or processor core(s) 504 may be integrated on the same die with logic for one or more controller(s) of system control logic 508. For some embodiments, at least one of the processor(s) or processor core(s) 504 may be integrated on the same die with logic for one or more controller(s) of system control logic 508 to form a System on Chip (SoC).

The system 500 may be a desktop, laptop or a tablet computer, a mobile telephone, a smart phone, a set-top box, a game console, or any other device having memory. In various embodiments, system 500 may have more or less components, and/or different architectures. For example, in various embodiments, the system 500 may include one or more cameras 528.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus, comprising:
a processor;
a memory coupled to the processor; and
a memory manager configured to be operated by the processor to:
   ascertain that a first interval of the memory is free;
   modify a state of the first interval of the memory to indicate that the first interval of the memory is in a coalescing state;
   determine whether a second interval of the memory, immediately preceding or immediately following the first interval of the memory, is free;
   after a determination that the second interval of the memory is free, modify a state of the second interval of the memory to indicate that the second interval of the memory is in a coalescing state; and
   coalesce the first interval of the memory and the second interval of the memory.

2. The apparatus of claim 1, wherein the memory manager is further configured to determine, from a header associated with the first interval of the memory, whether the second interval of the memory is free, in use, or in a coalescing state.

3. The apparatus of claim 2, wherein the memory manager is further configured to determine, from the header associated with the first interval of the memory, a size of the second interval of the memory.

4. The apparatus of claim 3, wherein the memory manager is further configured to lock the first interval of the memory and the second interval of the memory to prevent modification by application threads other than an application thread that invoked the memory manager.

5. The apparatus of claim 4, wherein the memory manager is further configured to independently lock the first interval of the memory and the second interval of the memory, without preventing or blocking execution of operations with other intervals of the memory performed by concurrent invocations of the memory manager by other threads of a multi-threaded application.

6. The apparatus of claim 4, wherein the memory manager is further configured to determine whether the second interval of the memory is free, determine the size of the second interval of the memory, modify the state of the second interval of the memory to indicate that it is in coalescing, and lock the second interval of the memory in an atomic operation.

7. The apparatus of claim 6, wherein the atomic operation is a compare-and-swap operation.

8. The apparatus of claim 2, wherein the memory manager is further configured to:
   after a determination that the second interval of the memory is in a coalescing state, insert an identification of the first interval of the memory into a coalesce queue to temporarily delay coalesce of the first and second intervals of the memory; and
   after a determination that the second interval of the memory is no longer in a coalescing state, remove the first interval of the memory from the coalesce queue and, where the second interval of the memory has transitioned from the in coalescing state to being free, enable a coalesce operation to coalesce the first and second intervals of the memory to proceed.

9. The apparatus of claim 1, wherein the memory manager is further configured to modify a state of the first interval of the memory to indicate that the first interval of the memory is free after a determination that the second interval of the memory is in use.

10. A computer-implemented method comprising:
ascertaining, by memory manager operated by a processor, that a first interval of a memory is free;
determining, by the memory manager, from a header associated with the first interval of the memory, whether a second interval of the memory, immediately preceding the first interval of the memory, is free or is currently being coalesced with a third interval of the memory, after ascertaining that the first interval of the memory is free;
coalescing, by the memory manager, the first interval of the memory and the second interval of the memory where the second interval of the memory is free; and
inserting, by the memory manager, an identification of the first interval of the memory into a coalesce queue where the second interval of the memory is currently being coalesced with the third interval of the memory to temporarily delay coalesce of the first and second intervals of the memory.

11. The computer-implemented method of claim 10, further comprising determining, by the memory manager, from the header associated with the first interval of the memory, a size of the second interval of the memory.

12. The computer-implemented method of claim 11, further comprising determining, by the memory manager, whether the second interval of the memory is free and the size of the second interval of the memory, as well as locking the second interval of memory, in an atomic operation.

13. The computer-implemented method of claim 12, wherein the atomic operation is a compare-and-swap operation.

14. The computer-implemented method of claim 10, further comprising modifying, by the memory manager, the header associated with the first interval of the memory to indicate that the first interval of the memory is locked.

15. The computer-implemented method of claim 14, further comprising determining, by the memory manager, from the header associated with the first interval of the memory, whether the second interval of the memory is in use by an application.

16. The computer-implemented method of claim 15, further comprising modifying, by the memory manager, the header associated with the first interval of the memory to indicate that the first interval of the memory is free after a determination that the second interval of the memory is in use by the application.

17. The computer-implemented method of claim 10, further comprising:
   after an insertion of the identification first interval of the memory into a coalesce queue, determining, by the memory manager, from the header associated with the first interval of the memory, whether the second interval of the memory is still being coalesced with the third interval of the memory; and
   removing, by the memory manager, the first interval of the memory from the coalesce queue on a determination that the second and third intervals of the memory have been coalesced to enable the coalesce operation to coalesce the first and second intervals of the memory to proceed.

18. A system, comprising:
a processor;
a memory coupled to the processor;
a camera coupled to the processor;

a memory manager configured to be operated by the processor to:

ascertain that a first interval of the memory is free;

determine, from a header associated with the first interval of the memory, whether a second interval of the memory, immediately preceding the first interval of the memory, is free; and coalesce the first interval of the memory and the second interval of the memory after a determination that the second interval of the memory is free.

19. The system of claim 18, further comprising at least one antenna, wherein the system is a mobile telephone.

20. The system of claim 18, further comprising a second camera coupled to the processor, wherein the system is a tablet computer.

21. A non-transitory computer-readable medium having computer-readable and executable code embodied therein, the code including instructions configured to cause an apparatus, in response to execution of the instructions, to:

ascertain that a first interval of a memory of the apparatus is free;

determine whether a second interval of the memory, immediately preceding or following the first interval of the memory, is free or is currently being coalesced with a third interval of the memory; and coalesce the first interval of the memory and the second interval of the memory, if the second interval of the memory is determined to be free, or insert an identification of the first interval of the memory into a coalesce queue, if the second interval of the memory is determined to be currently being coalesced with the third interval of the memory, to temporarily delay coalesce of the first and second intervals of the memory.

22. The non-transitory computer-readable medium of claim 21, further comprising instructions configured to cause the apparatus, in response to execution of the instructions, to determine, from the header associated with the first interval of the memory, a size of the second interval of the memory.

23. The non-transitory computer-readable medium of claim 21, further comprising instructions configured to cause the apparatus, in response to execution of the instructions, to determine whether the second interval of the memory is free and determine a size of the second interval of the memory, and to lock the second interval of memory, all in an atomic operation.

24. The non-transitory computer-readable medium of claim 23, wherein the atomic operation is a compare and-swap operation.

25. The non-transitory computer-readable medium of claim 21, further comprising instructions configured to cause the apparatus, in response to execution of the instructions, to modify the header associated with the first interval of the memory to indicate that the first interval of the memory is in use.

26. The non-transitory computer-readable medium of claim 25, further comprising instructions configured to cause the apparatus, in response to execution of the instructions, to modify the header associated with the first interval of the memory to indicate that the first interval of the memory is free after a determination that the second interval of the memory is in use.

27. The non-transitory computer-readable medium of claim 26, further comprising instructions configured to cause the apparatus, in response to execution of the instructions, to:

determine, after an insertion of the identification of the first interval of the memory into the coalesce queue, from the header associated with the first interval of the memory, whether the second interval of the memory is still being coalesced with the third interval of the memory;

remove the identification of the first interval of the memory from the coalesce queue on a determination that the second interval of memory is no longer being coalesced;

after the determination that the second interval of memory is no longer being coalesced, enabling a coalesce operation to coalesce the first and second intervals of the memory to proceed where the second interval of the memory is free; and after the determination that the second interval of memory is no longer being coalesced, modifying the header associated with the first interval of the memory to indicate that the first interval of the memory is free where the second interval of the memory transitioned from being coalesced to being in use.

* * * * *